United States Patent
Prudnikov (10) Patent No.: US 7,826,118 B2
(45) Date of Patent: Nov. 2, 2010

(54) COMPOSITE SCANNING UNIT FOR REDUCING SPECKLE NOISE AND LASER PROJECTION SYSTEM EMPLOYING THE SAME

(75) Inventor: Oleg Prudnikov, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 496 days.

(21) Appl. No.: 11/844,731

(22) Filed: Aug. 24, 2007

(65) Prior Publication Data

US 2008/0137163 A1 Jun. 12, 2008

(30) Foreign Application Priority Data

Dec. 8, 2006 (KR) .................... 10-2006-0125073

(51) Int. Cl.
*G02B 26/08* (2006.01)
(52) U.S. Cl. .................................................. 359/216.1
(58) Field of Classification Search ............. 359/201.1, 359/201.2, 203.1, 204.1, 204.2, 216.1–218.1
See application file for complete search history.

(56) References Cited

U.S. PATENT DOCUMENTS 7,042,606 B2 * 5/2006 Yang et al. ............... 359/204.2

* cited by examiner

*Primary Examiner*—Euncha P Cherry
(74) *Attorney, Agent, or Firm*—Sughrue Mion, PLLC

(57) ABSTRACT

A composite scanning unit for reducing speckle noise and a laser projection system employing the composite scanning unit are provided. The composite scanning unit includes a plurality of mirror surfaces disposed along a rotation axis, wherein at least two of the plurality of mirror surfaces sequentially scan diffraction beams having different orders on the screen.

23 Claims, 6 Drawing Sheets

COMPOSITE SCANNING UNIT FOR REDUCING SPECKLE NOISE AND LASER PROJECTION SYSTEM EMPLOYING THE SAME

CROSS-REFERENCE TO RELATED PATENT APPLICATION

This application claims priority from Korean Patent Application No. 10-2006-0125073, filed on Dec. 8, 2006, in the Korean Intellectual Property Office, the disclosure of which is incorporated herein by reference in its entirety.

BACKGROUND

1. Technical Field

Apparatuses and methods consistent with the present invention relate to a laser projection system reducing speckle noise, and more particularly, to a composite scanning unit sequentially scanning diffraction beams of different orders on a screen to reduce speckle noise and a laser projection system employing the same.

2. Description of the Related Art

A projection system modulates a plurality of monochromatic beams using image information, and then magnifies and projects the modulated monochromatic beams onto a screen so as to display a color image. The projection system may adopt various types of light sources. A laser light source emits a laser beam having a greater intensity and a higher luminance than other light sources. Thus, the laser light source can provide a clear image having a high contrast and, thus, is preferred. However, a laser beam has is highly coherent, which causes speckle noise. A speckle is a mottled pattern generated by a peculiar fluctuation of a laser beam incident on a screen due to surface roughness of the screen and remarkably deteriorates image quality.

Methods of reducing speckle noise are generally based on a formation of time varying speckle patterns in a detecting system. The speckle noise may be improved, from the point of view of a detector, e.g., eyes of a human, by time averaging. Thus, an image frame having N uncorrelated speckle patterns must be formed to reduce the speckle noise. A speckle contrast C is defined as a dispersion over an average of light intensities indicated by speckle, i.e., "$C=\sigma_I/<I>$." Thus, if the image frame has N uncorrelated speckle patterns, the speckle contrast C is reduced to $1/\sqrt{N}$. As a result, it is important how N uncorrelated speckle patterns are to be formed. For this, a method of producing a spatial diversity of a laser beam, a method of producing a time diversity of the laser beam, a method of increasing a bandwidth, a method of diverging a phase, etc. have been suggested.

A solution to the speckle noise is limited by a structure and technical requirements of a used optical system. For example, if a variable diffractive grating device, such as a grating light valve (GLV), is used as a light modulation device, an image contrast is very sensitive to a bandwidth of the wavelength of light incident on the variable diffractive grating device, and brightness of pixels on a screen is affected by a relative variation of a variable ribbon of the GLV generating a phase difference. The phase difference is a function of the wavelength. If the bandwidth of the wavelength is increased, the image contrast is worsened. Therefore, if the bandwidth is increased enough to reduce speckle noise, the image contrast is remarkably deteriorated. In other words, a projection system using such a variable diffractive grating device must adopt a highly monochromatic laser source and cannot employ a method of realizing a reduction in speckle noise by increasing a bandwidth of the wavelength of light.

SUMMARY OF THE INVENTION

Aspects of the present invention provide a composite scanning unit sequentially scanning diffraction beams having different orders on a screen to reduce speckle noise and a laser projection system employing the composite scanning unit.

An aspect of the present invention provides a composite scanning unit adopted in a line scan type laser projection system including a line type optical modulator, and rotating to scan light of a line panel on a screen, the composite scanning unit including: a plurality of mirror surfaces disposed along a rotation axis, wherein at least two of the plurality of mirror surfaces sequentially scan diffraction beams having different orders on the screen.

Another aspect of the present invention provides a laser projection system including: a laser source; a line type optical modulator modulating a laser beam emitted from the laser source using image information to form a line panel; a projection lens unit projecting the line panel formed by the line type optical modulator towards a screen; and a composite scanning unit disposed between the projection lens unit and the screen to scan the line panel on the screen and comprising a plurality of mirror surfaces disposed to rotate around a rotation axis, wherein at least two of the plurality of mirror surfaces sequentially scan diffraction beams of different orders on the screen.

BRIEF DESCRIPTION OF THE DRAWINGS

The aspects of the present invention will become more apparent by describing in detail exemplary embodiments thereof with reference to the attached drawings in which:

FIGS. 3A, 3B and 3C illustrate a process of sequentially scanning $1^{st}$, $0^{th}$, and $-1^{st}$ diffraction beams on a screen using the composite scanning unit of FIG. 2;

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the exemplary embodiments set forth herein; rather, these exemplary embodiments are provided for illustrative purposes so that this disclosure will be thorough and complete, and will fully convey the concept of the invention to those skilled in the art. In the drawings, the thicknesses of layers and regions are exaggerated for clarity. Like reference numerals in the drawings denote like elements, and thus their description will be omitted.

Figure 1:
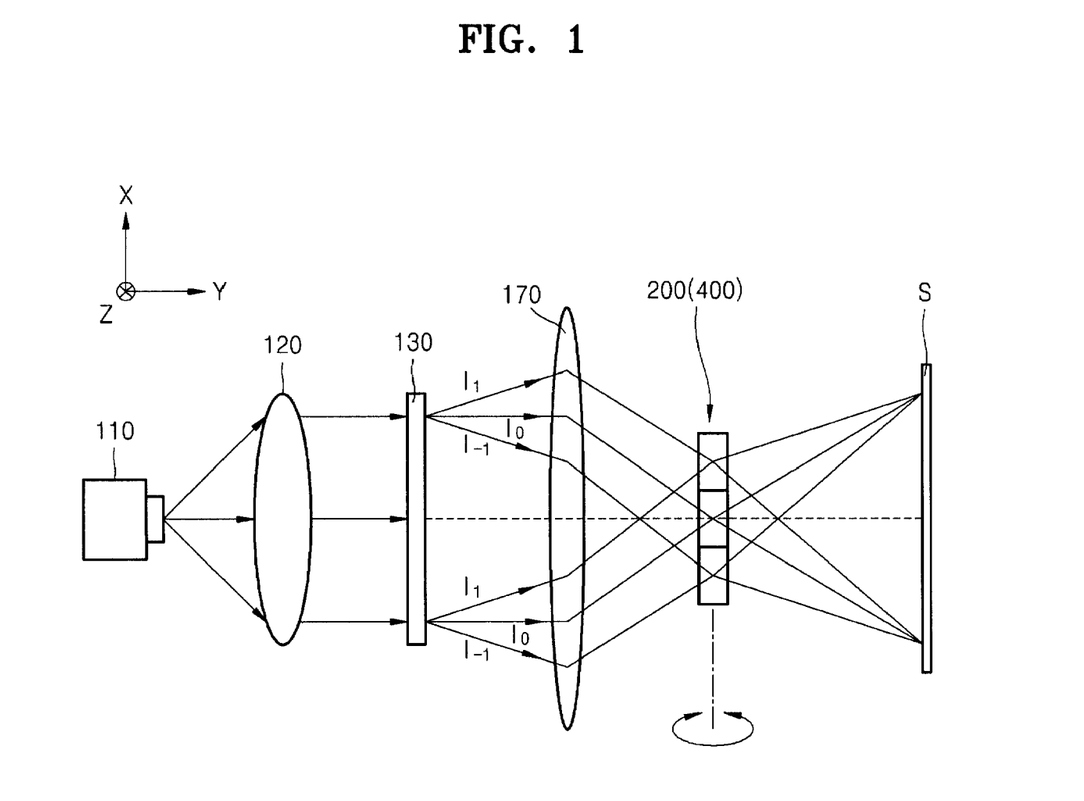
FIG. 1 is a schematic view illustrating an optical arrangement of a laser projection system according to an exemplary embodiment of the present invention.

FIG. 1 is a schematic view illustrating an optical arrangement of a laser projection system according to an exemplary embodiment of the present invention. Referring to FIG. 1, the laser projection system according to the present exemplary embodiment includes a light source 110, an optical modulator 130, a projection lens unit 170, and a composite scanning unit 200 or 400. The light source 110 generates and irradiates a laser beam. The optical modulator 130 modulates the laser beam using image information. The projection lens unit 170 projects the modulated laser beam onto a screen S. The composite scanning unit 200 or 400 is disposed between the projection lens unit 170 and the screen S to scan the laser beam on the screen S. A collimating unit 120 may be disposed on an optical path between the light source 110 and the optical modulator 130 to collimate the laser beam to correspond to the optical modulator 130. The number of light sources 110 is this exemplary embodiment is one. However, this embodiment is exemplary, and as such, a plurality of light sources may be provided consistent with the present invention. Also, the light source 110 may include a plurality of monochromatic light sources and a color combining unit.

The laser projection system of the present invention is a line scan type projection system, and the optical modulator 130 is a line type optical modulator. For example, the optical modulator 130 may be a grating light valve (GLV) or a samsung optical modulator (SOM). The GLV modulates light using a diffraction effect of the light, i.e., reflects the light or generates diffraction beams $I_1$, $I_0$, and $I_{-1}$ according to a relative motion of variable ribbons. The GLV is well known in the art, and thus a detailed description thereof will be omitted. The composite scanning unit 200 or 400 is disposed on an optical path formed between the projection lens unit 170 and the screen S to scan a line panel formed from the optical modulator 130 on the screen S so as to form an image on the screen S. The composite scanning unit 200 or 400 may be disposed at a focal point of the projection lens unit 170 or near the focal point of the projection lens unit 170. When the composite scanning unit 200 or 400 scans the laser beam on the screen S, the composite scanning unit 200 or 400 forms N uncorrelated speckle patterns to improve speckle noise by taking advantage of the persistence of vision. For this purpose, the composite scanning unit 200 or 400 includes a plurality of mirror surfaces. At least two of the plurality of mirror surfaces sequentially scan diffraction beams having different orders on the screen S.

The detailed structure of the exemplary composite scanning unit 200 or 400 and an operation of reducing speckle noise through the composite scanning unit 200 will now be described.

Figure 2:
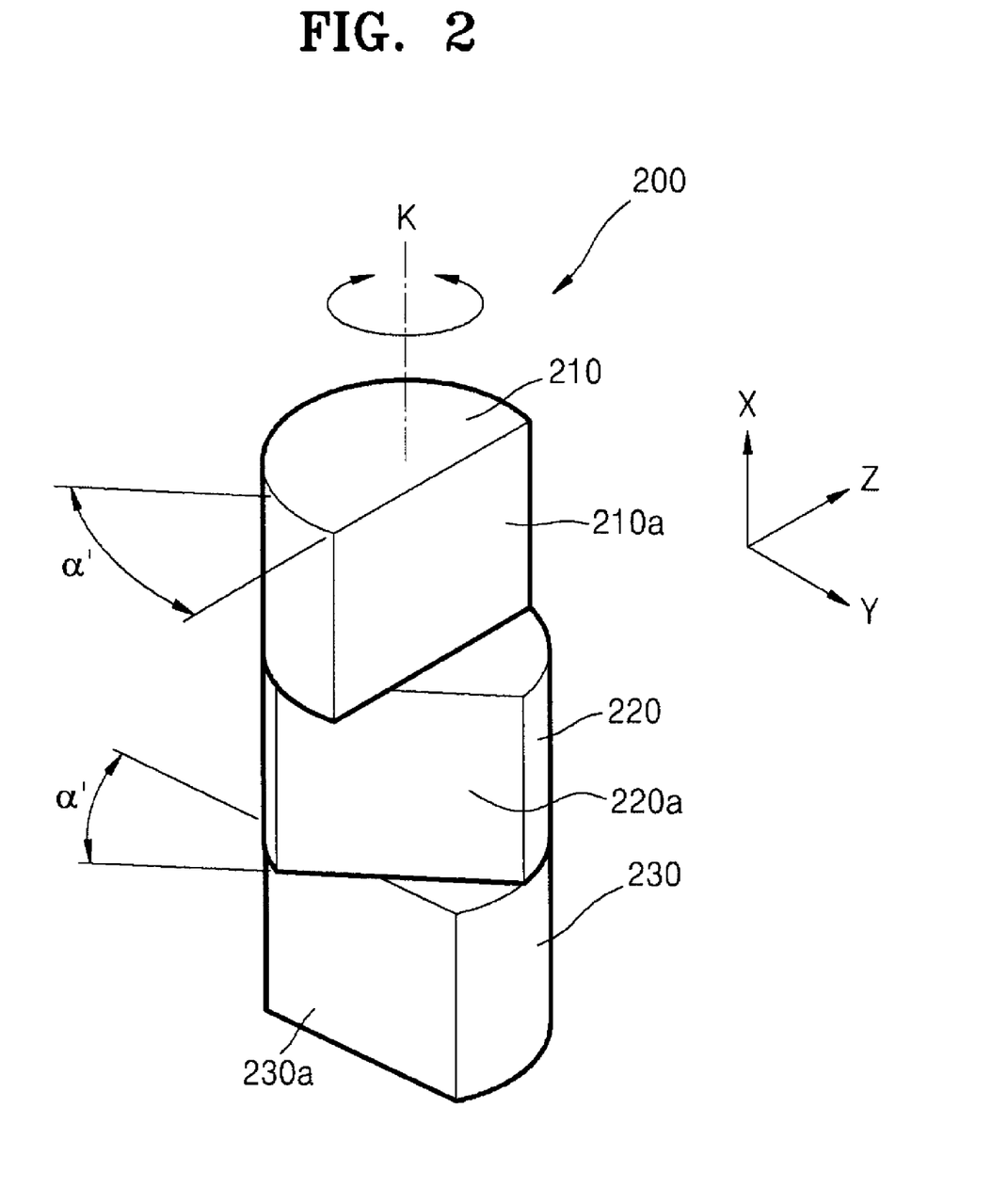
FIG. 2 illustrates a composite scanning unit adopted in the laser projection system of FIG. 1, according to an exemplary embodiment of the present invention.
Figure 3A:
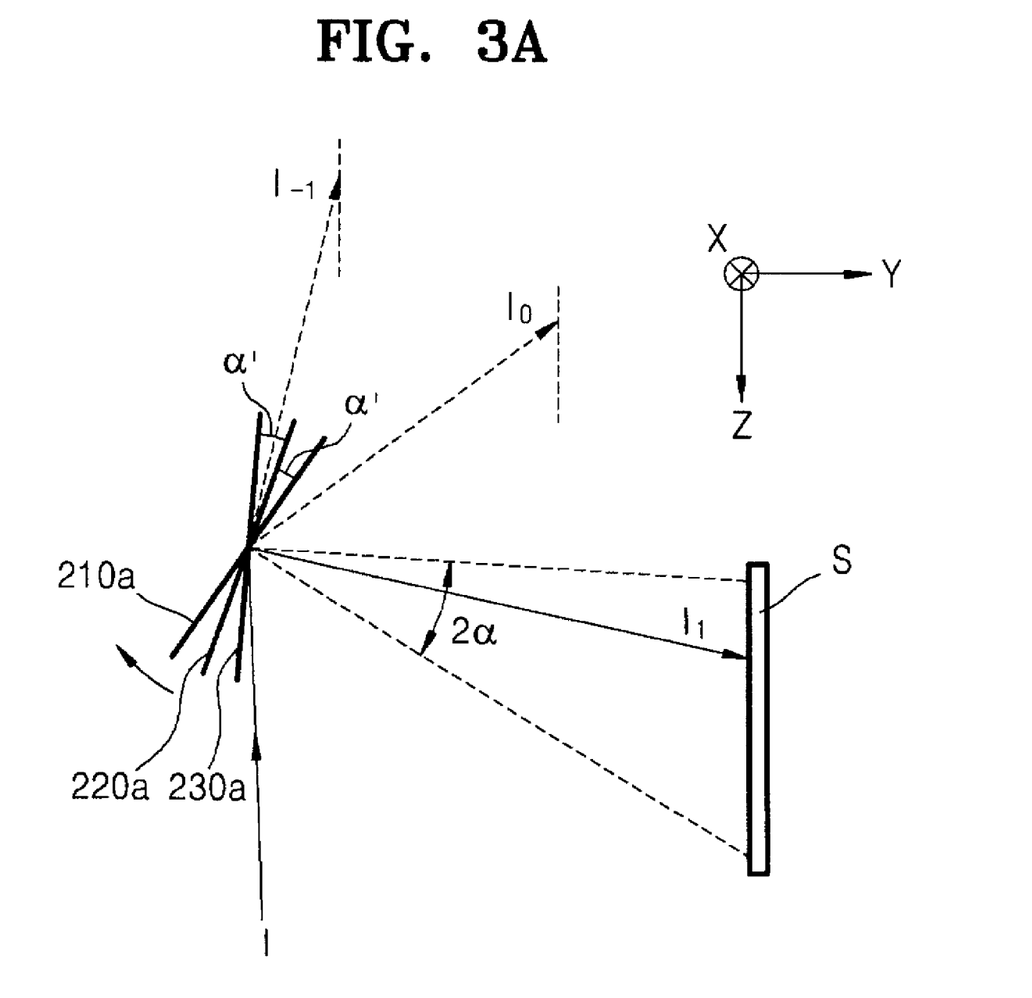
Figure 3C:
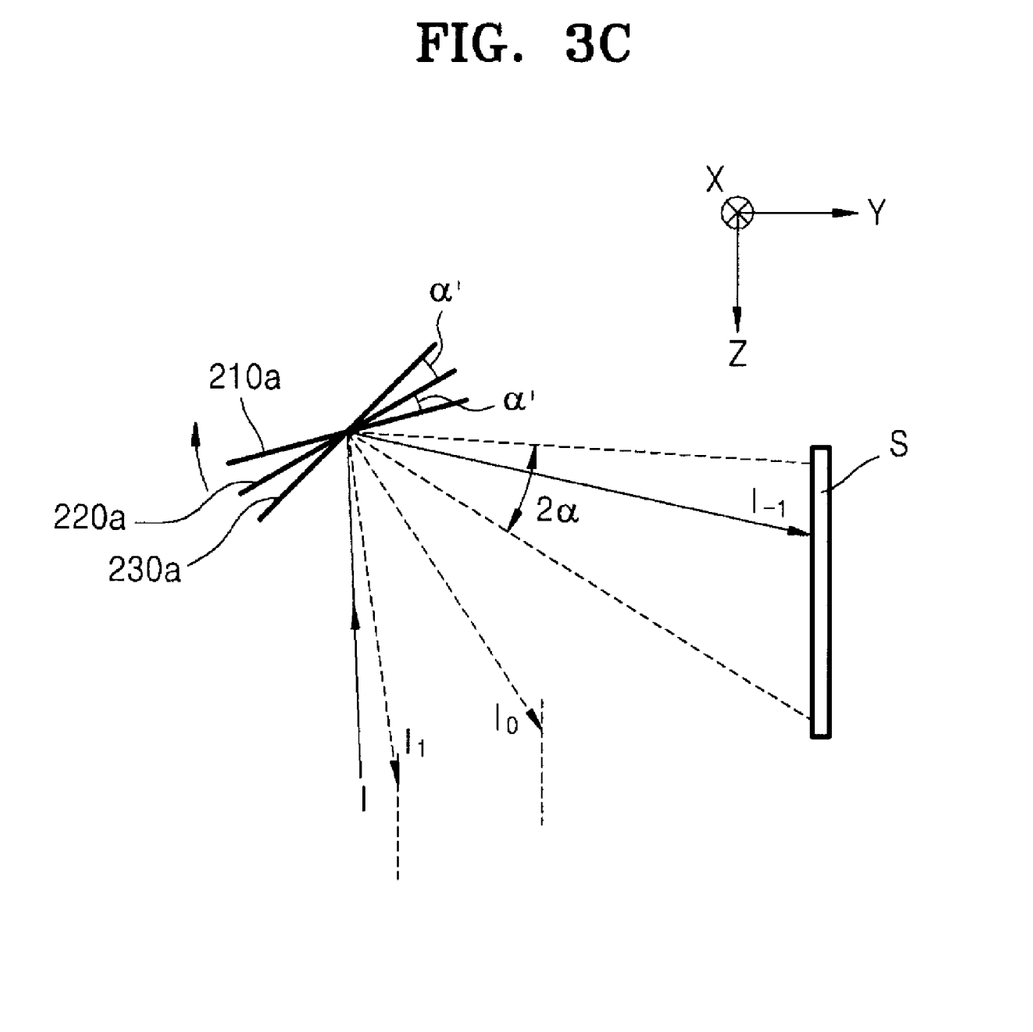

FIG. 2 illustrates the composite scanning unit 200 adopted in the laser projection system of FIG. 1, according to an exemplary embodiment of the present invention. FIGS. 3A, 3B and 3C illustrate a process of sequentially scanning $1^{st}$, $0^{th}$, and $-1^{st}$ order diffraction beams on the screen S using the composite scanning unit 200 of FIG. 2. Referring to FIG. 2, the composite scanning unit 200 includes a plurality of mirror surfaces which sequentially scan diffraction beams having different orders on the screen S. In particular, according to an exemplary embodiment of the present invention, the optical modulator 130 forms $1^{st}$-order, $0^{th}$-order, and $-1^{st}$-order diffraction beams. Thus, the composite scanning unit 200 includes first, second, and third scanners 210, 220, and 230 respectively scanning $1^{st}$-order, $0^{th}$-order and $-1^{st}$-order diffraction beams $I_1$, $I_0$, and $I_{-1}$ generated by the optical modulator 130. The first, second, and third scanners 210, 220, and 230 include first, second, and third mirror surfaces 210a, 220a, and 230a, respectively, which reflect laser beams toward the screen S. The first, second, and third scanners 210, 220, and 230 are disposed along a rotation axis K. Thus, the composite scanning unit 200 rotates around the rotation axis K to scan laser beams in a direction Z towards the screen S. Here, the second mirror surface 220a is offset at a predetermined angle α' from the first mirror surface 210a, and the third mirror surface 230a is offset at a predetermined angle α' from the second mirror surface 220a. The first, second, and third mirror surfaces 210a, 220a, and 230a are offset to facilitate sequential scanning of the $1^{st}$-order, $0^{th}$-order, and $-1^{st}$-order diffraction beams $I_1$, $I_0$, and $I_{-1}$ on the screen S. If an angle between both ends of the scanned screen S viewed from the rotation axis K is 2α, a rotation angle of the composite scanning unit 200 for scanning an entire area of the screen S is α. Here, α' must be greater than or equal to α so that one diffraction beam is scanned on the screen S after another diffraction beam is scanned on the entire area of the screen S. According to an exemplary embodiment of the present invention, α' may be equal to α. If the first, second, and third mirror surfaces 210a, 220a, and 230a rotate with a rotation of the composite scanning unit 200, the first, second, and third mirror surfaces 210a, 220a, and 230a offset at predetermined angles respectively reflect the $1^{st}$-order, $0^{th}$-order and $-1^{st}$-order diffraction beams $I_1$, $I_0$, and $I_{-1}$ in different directions.

FIG. 3A illustrates a process of scanning the $1^{st}$-order diffraction beam $I_1$ on the screen S using the first mirror surface 210a. Referring to FIG. 3A, while the first mirror surface 210a scans the $1^{st}$-order diffraction beam $I_1$ on the screen S, the second and third mirror surfaces 220a and 230a, respectively, reflect the $0^{th}$-order and $-1^{st}$-order diffraction beams $I_0$ and $I_{-1}$ in directions which are not directed towards the screen S. Here, the second mirror surface 220a is offset at an angle α' from the first mirror surface 210a, wherein the angle α' is equal to or greater than the rotation angle α for scanning the entire area of the screen S. Thus, the $0^{th}$-order diffraction beam $I_0$, reflected from the second mirror surface 220a, does not reach the screen S until the first mirror surface 210a scans the entire area of the screen S. Here, a time required for scanning the entire area of the screen S using the first mirror surface 210a is $\tau_+$.

FIG. 3B illustrates a process of scanning the $0^{th}$-order diffraction beam $I_0$ using the second mirror surface 220a. If the first mirror surface 210a starts to scan the screen S at a time t=0, then the second mirror surface 220a starts to scan the $0^{th}$-order diffraction beam $I_0$ on the screen S at a predetermined time where $t \geq \tau_+$. While the second mirror surface 220a scans the $0^{th}$-order diffraction beam $I_0$ on the screen S, the first and third mirror surfaces 210a and 230a, respectively, reflect the $1^{st}$-order and $-1^{st}$-order diffraction beams $I_1$ and $I_{-1}$ in directions which are not directed towards the screen S. Here, a time required for scanning the entire area of the screen S using the second mirror surface 220a is $\tau_0$.

FIG. 3C illustrates a process of scanning the $-1^{st}$-order diffraction beam $I_{-1}$ on the screen S using the third mirror surface 230a. The third mirror surface 230a starts to scan the $-1^{st}$-order diffraction beam $I_{-1}$ on the screen S at a predetermined time $t \geq \tau_+ + \tau_0$. While the third mirror surface 230a starts to scan the $-1^{st}$-order diffraction beam $I_{-1}$ on the screen S, the first and second mirror surfaces 210a and 220a, respectively, reflect the $1^{st}$-order and $0^{th}$-order diffraction beams $I_1$ and $I_0$ in directions which are not directed towards the screen S.

While the composite scanning unit 200 rotates through an angle 3α', the $1^{st}$-order, $0^{th}$-order, and $-1^{st}$-order diffraction beams $I_1$, $I_0$, and $I_{-1}$ are sequentially scanned on the screen S. For example, if α'=α, when $0 \leq t \leq \tau_+$, only the $1^{st}$-order diffraction beam $I_1$ is being scanned on the screen S and when $\tau_+ \leq t \leq \tau_+ + \tau_0$, only the $0^{th}$-order diffraction beam $I_0$ is being scanned on the screen S. If $\tau_+ + \tau_0 \leq t \leq \tau_+ \tau_0 + \tau_-$, then only the $-1^{st}$-order diffraction beam $I_{-1}$ is being scanned on the screen S. Images formed in respective steps are formed by different diffraction beams irradiated on a screen at different times. The images are averaged with respect to the persistence of vision to generate an image frame. In other words, the generated image frame includes three uncorrelated speckle noise patterns, and thus speckle noise may be reduced to a maximum of $1/\sqrt{3}$. A speckle noise reduction factor R is expressed as in Equation 1:

$$R = \sqrt{\frac{|I_0|\tau_0 + |I_{-1}|\tau_- + |I_{+1}|\tau_+}{(|I_0|\tau_0)^2 + (|I_{-1}|\tau_-)^2 + (|I_{+1}|\tau_+)^2}} \quad (1)$$

wherein $|I_0|$, $|I_{+1}|$, $|I_{-1}|$ denote intensities of the $0^{th}$-order, $1^{st}$-order, and $-1^{st}$-order diffraction beams $I_0$, $I_1$, and $I_{-1}$, respectively.

Under the condition of Equation 2, set forth below, the speckle noise reduction factor R has a maximum value of $\sqrt{3}$.

$$|I_0|\tau_0 = |I_{+1}|\tau_+ = |I_{-1}|\tau_- \quad (2)$$

Scanning times $\tau_0$, $\tau_+$, and $\tau_-$ are determined by a rotational angular velocity of the composite scanning unit 200. In general, the intensities $|I_0|$, $|I_{+1}|$, $|I_{-1}|$ of the $1^{st}$-order, $0^{th}$-order, and $-1^{st}$-order diffraction beams $I_1$, $I_0$, and $I_{-1}$ are more easily adjusted than the scanning times $\tau_0$, $\tau_+$, and $\tau_-$. The intensities $|I_0|$, $|I_{+1}|$, $|I_{-1}|$ may be adjusted to be as bright as possible within a range of adjusting the scanning times $\tau_0$, $\tau_+$, and $\tau_-$.

Figure 4:
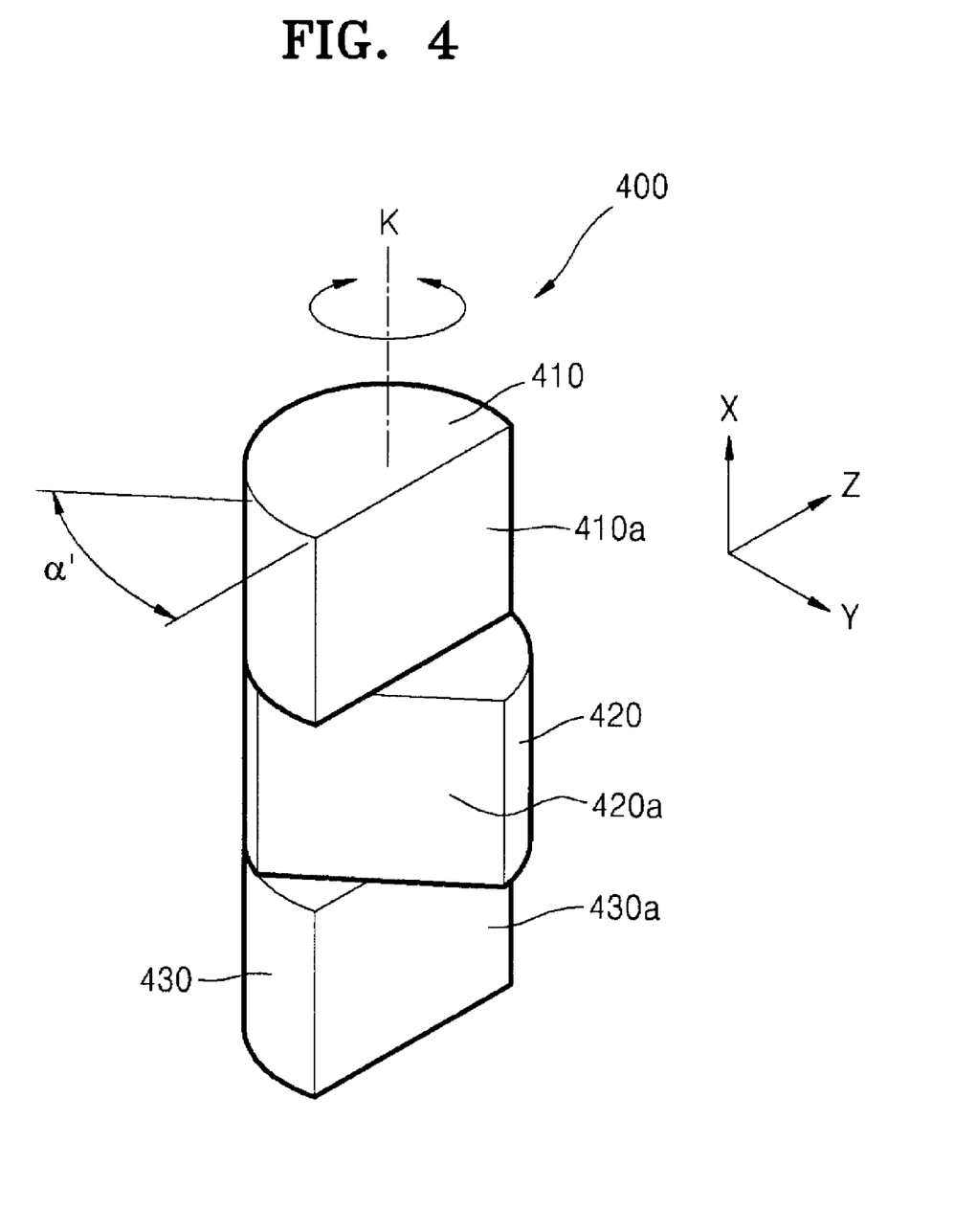
FIG. 4 illustrates a composite scanning unit adopted in the laser projection system of FIG. 1, according to another exemplary embodiment of the present invention.
Figure 5A:
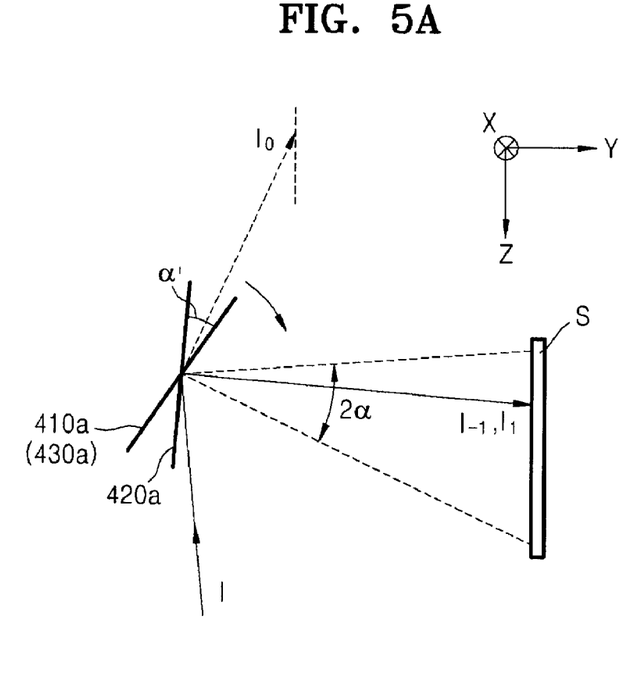
FIGS. 5A and 5B illustrate a process of sequentially scanning $1^{st}$, $-1^{st}$, and $0^{th}$ diffraction beams on a screen using the composite scanning unit of FIG. 4.
Figure 5B:
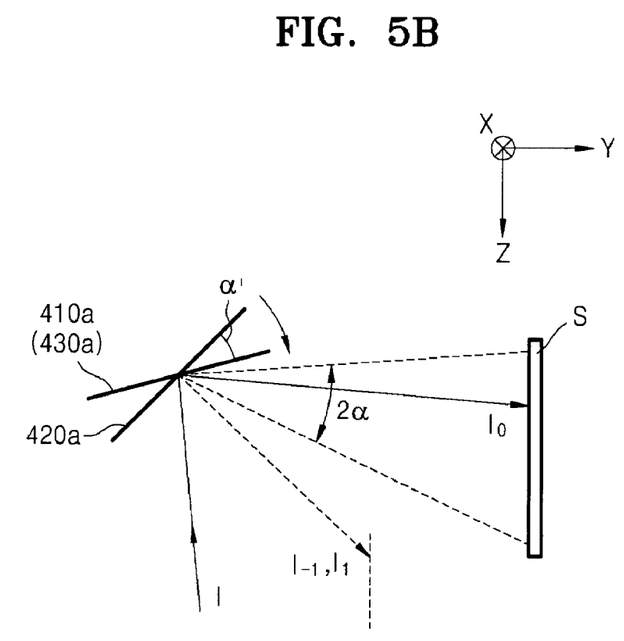

FIG. 4 illustrates the composite scanning unit 400 adopted in the laser projection system of FIG. 1, according to another exemplary embodiment of the present invention, and FIGS. 5A and 5B illustrate a process of scanning $1^{st}$ and $-1^{st}$, and then $0^{th}$ diffraction beams on a screen S using the composite scanning unit 400 of FIG. 4.

The composite scanning unit 400 of the present exemplary embodiment forms two uncorrelated speckle noise patterns to reduce speckle noise to a minimum. Referring to FIG. 4, the composite scanning unit 400 includes first, second, and third scanners 410, 420, and 430 which respectively scan $1^{st}$-order, $0^{th}$-order, and $-1^{st}$-order diffraction beams $I_1$, $I_0$, and $I_{-1}$ generated by the optical modulator 130 of FIG. 1. The first, second, and third scanners 410, 420, and 430, respectively, include first, second, and third mirror surfaces 410a, 420a, and 430a, which reflect laser beams toward the screen S. The first, second, and third scanners 410, 420, and 430 are disposed along a rotation axis K. Thus, the composite scanning unit 400 rotates around the rotation axis K to scan laser beams in direction Z towards the screen S. Two of the first, second, and third mirror surfaces 410a, 420a, and 430a are parallel with each other and offset at a predetermined angle $\alpha'$ relative to each other. For example, as shown in FIG. 4, the second mirror surface 420a is offset at the predetermined angle $\alpha'$ from the first mirror surface 410a, and the third and first mirror surfaces 430a and 410a, respectively, are parallel with each other. As described above, the first and third mirror surfaces 410a and 430a are parallel with each other, and the second mirror surface 420a is angled relative to the first and third mirror surfaces 410a and 430a. Thus, after the $1^{st}$-order and $-1^{st}$-order diffraction beams $I_1$ and $I_{-1}$ are simultaneously scanned on the screen S, the $0^{th}$-order diffraction beam $I_0$ is scanned on the screen S. If an angle between both ends of the screen S, scanned from a point on the rotation axis K, is $2\alpha$, a rotation angle of the composite scanning unit 400 for scanning an entire area of the screen S is $\alpha$. $\alpha'$ must be equal to or greater than $\alpha$ so that the $0^{th}$-order diffraction beam $I_0$ is not directed toward the screen S while the $1^{st}$-order and $-1^{st}$-order diffraction beams $I_1$ and $I_{-1}$ are scanned. According to an exemplary embodiment of the present invention, $\alpha'$ may be equal to $\alpha$.

FIG. 5A illustrates a process of scanning the $1^{st}$-order and $-1^{st}$-order diffraction beams $I_1$ and $I_{-1}$ on the screen S using the first and third mirror surfaces 410a and 430a. Referring to FIG. 5A, while the first and third mirror surfaces 410a and 430a scan the $1^{st}$-order and $-1^{st}$-order diffraction beams $I_1$ and $I_{-1}$ on the screen S, the second mirror surface 420a reflects the $0^{th}$-order diffraction beam $I_0$ in a direction which is not directed towards the screen S. Here, a total time required for scanning an entire area of the screen S through the first and third mirror surfaces 410a and 430a is $\tau_\pm$.

FIG. 5B illustrates a process of scanning the $0^{th}$-order diffraction beam $I_0$ on the screen S using the second mirror surface 420a. If a time for starting scanning the screen S using the first and third mirror surfaces 410a and 430a is $t=0$, the second mirror surface 420a starts to scan the $0^{th}$-order diffraction beam $I_0$ on the screen S at a predetermined time $t \geq \tau_\pm$. While the second mirror surface 420a starts to scan the $0^{th}$-order diffraction beam $I_0$ on the screen S, the first and third mirror surfaces 410a and 430a, respectively, reflect the $1^{st}$-order and $-1^{st}$-order diffraction beams $I_1$ and $I_{-1}$ in directions which are not directed towards the screen S. Here, a time required for scanning an entire area of the screen S using the second mirror surface 420a is $\tau_0$.

While the composite scanning unit 400 rotates through an angle $2\alpha'$, the $1^{st}$-order and $-1^{st}$-order diffraction beams $I_1$ and $I_{-1}$ are scanned on the screen S, and then the $0^{th}$-order diffraction beam $I_0$ is scanned on the screen S. For example, if $\alpha' = \alpha$, only the $1^{st}$-order and $-1^{st}$-order diffraction beams $I_1$ and $I_{-1}$ are the being scanned on the screen S when $0 \leq t \leq \tau_\pm$ and only the $0^{th}$-order diffraction beam $I_0$ is being scanned on the screen S when $\tau_\pm \geq t \geq \tau_\pm + \tau_0$. As described above, in the present exemplary embodiment, images formed by different diffraction beams irradiated at different times onto a screen are combined to generate an image frame including two uncorrelated speckle noise patterns. Thus, speckle noise can be reduced to a maximum of $1/\sqrt{2}$. A speckle noise reduction factor R is expressed as in Equation 3:

$$R = \sqrt{\frac{|I_0|\tau_0 + |I_{-1}|\tau_- + |I_{+1}|\tau_+}{(|I_0|\tau_0)^2 + ((|I_{-1}| + |I_{+1}|)\tau_\pm)^2}} \quad (3)$$

wherein $|I_0|$, $|I_{+1}|$, $|I_{-1}|$ denote intensities of $0^{th}$-order, the $1^{st}$-order, and $-1^{st}$-order diffraction beams $I_0$, $I_1$, and $I_{-1}$, respectively.

Under the condition of Equation 4, set forth below, the speckle noise reduction factor R has a maximum value of $\sqrt{2}$.

$$|I_0|\tau_0 = (|I_{+1}| + |I_{-1}|)\tau_\pm \quad (4)$$

Scanning times $\tau_0$ and $\tau_\pm$ are determined by a rotation angular velocity of the composite scanning unit 400. In general, the intensities $|I_0|$, $|I_{+1}|$, $|I_{-1}|$ of the $0^{th}$-order, $1^{st}$-order, and $-1^{st}$-order diffraction beams $I_0$, $I_1$, and $I_{-1}$ are more easily adjusted than the scanning times $\tau_0$ and $\tau_\pm$. The intensities $|I_0|$, $|I_{+1}|$, $|I_{-1}|$ may be adjusted to be as bright as possible within a range of adjusting the scanning times $\tau_0$ and $\tau_\pm$. It has been described in the present exemplary embodiment that $1^{st}$-order and $-1^{st}$-order diffraction beams $I_1$ and $I_{-1}$ are simultaneously scanned, and then a $0^{th}$-order diffraction beam $I_0$ is scanned.

However, this embodiment is merely exemplary, and thus other combinations may be made consistent with the present invention. In the present exemplary embodiment, the speckle noise reduction factor is $\sqrt{2}$, which is smaller than the speckle noise reduction factor $\sqrt{3}$ of the previous exemplary embodiment. However, a total time required for forming an image frame can be reduced.

As described above, a composite scanning unit for reducing speckle noise according to the present invention can include a plurality of mirror surfaces. Thus, diffraction beams having different orders can be sequentially scanned on a screen. Thus, a laser projection system employing the composite scanning unit can form uncorrelated speckle noise patterns without a great change of structure of an optical system. As a result, speckle noise can be effectively reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A composite scanning unit comprising:
a plurality of mirror surfaces disposed along a rotation axis,
wherein at least two of the plurality of mirror surfaces sequentially scan diffraction beams having different orders on an area of a screen, such that after one of the at least two of the plurality of mirror surfaces scans a diffraction beam on an entire area of the screen, the other of the at least two of the plurality of mirror surfaces scans a diffraction beam on the entire area of the screen,
wherein the at least two mirror surfaces are offset relative to each other by a predetermined angle α' which satisfies the equation below:

$$\alpha' \geq \alpha,$$

wherein α denotes a rotation angle for scanning the entire area of the screen using the composite scanning unit.

2. The composite scanning unit of claim 1, wherein the composite scanning unit is adopted in a line scan type laser projection system.

3. The composite scanning unit of claim 2, wherein the line scan type laser projection system comprises a line type optical modulator.

4. The composite scanning unit of claim 3, wherein the line scan type laser projection system is configured to rotate to scan light of a line panel on the screen.

5. The composite scanning unit of claim 1, wherein the two mirror surfaces are offset relative to each other by the angle α.

6. The composite scanning unit of claim 2, wherein the line scan type laser projection system comprises a line type optical modulator, and
wherein the line type optical modulator generates a $-1^{st}$-order diffraction beam, a $0^{th}$-order diffraction beam, and a $1^{st}$-order diffraction beam.

7. The composite scanning unit of claim 6, wherein the line type optical modulator comprises a grating light valve (GLV).

8. The composite scanning unit of claim 6, further comprising:
a first scanner comprising a first mirror surface for scanning the $1^{st}$-order diffraction beam;
a second scanner comprising a second mirror surface for scanning the $0^{th}$-order diffraction beam; and
a third scanner comprising a third mirror surface for scanning the $-1^{st}$-order diffraction beam.

9. The composite scanning unit of claim 8, wherein each of the first, second, and third mirror surfaces is offset from an adjacent mirror surface from among the first, second, and third mirror surfaces by the predetermined angle α'.

10. The composite scanning unit of claim 8, wherein two of the first, second, and third mirror surfaces are parallel with each other, and
wherein the two mirror surfaces that are parallel with each other are offset relative to one of the first, second and third mirror surfaces by the predetermined angle α'.

11. A laser projection system comprising:
a laser light source;
a line type optical modulator, which modulates a laser beam emitted from the laser light source using image information, to form a line panel;
a projection lens unit, which projects the line panel towards a screen; and
a composite scanning unit disposed between the projection lens unit and the screen, which scans the line panel on the screen,
wherein the composite scanning unit comprises a plurality of mirror surfaces disposed along a rotation axis,
wherein at least two of the plurality of mirror surfaces sequentially scan diffraction beams of different orders on the screen, such that after one of the at least two of the plurality of mirror surfaces scans a diffraction beam on an entire area of the screen, the other of the at least two of the plurality of mirror surfaces scans a diffraction beam on the entire area of the screen,
wherein the at least two mirror surfaces are offset relative to each other by a predetermined angle α' which satisfies the equation below:

$$\alpha' \geq \alpha,$$

wherein α denotes a rotation angle for scanning the entire area of the screen using the composite scanning unit.

12. The laser projection system of claim 11, wherein the composite scanning unit is disposed near a focal point of the projection lens unit.

13. The laser projection system of claim 12, wherein the composite scanning unit is disposed at a focal point of the projection lens unit.

14. The laser projection system of claim 11, wherein the at least two mirror surfaces are offset relative to each other by the angle α.

15. The laser projection system of claim 11, wherein the line type optical modulator generates a $-1^{st}$-order diffraction beam, a $0^{th}$-order diffraction beam, and a $1^{st}$-order diffraction beam.

16. The laser projection system of claim 15, wherein the line type optical modulator comprises a GLV.

17. The laser projection system of claim 15, further comprising:
a first scanner comprising a first mirror surface for scanning the $1^{st}$-order diffraction beam;
a second scanner comprising a second mirror surface for scanning the $0^{th}$-order diffraction beam; and
a third scanner comprising a third mirror surface for scanning the $-1^{st}$-order diffraction beam.

18. The laser projection system of claim 17, wherein each of the first, second, and third mirror surfaces is offset from an adjacent mirror surface from among the first, second, and third mirror surfaces by the angle α'.

19. The laser projection system of claim 18, wherein the laser projection system satisfies the equation below:

$$|I_0|\tau_0 = |I_{+1}|\tau_+ = |I_{-1}|\tau_-$$

wherein $|I_{+1}|$, $|I_0|$, $|I_{-1}|$ respectively denote intensities of the $1^{st}$-order diffraction beam $I_1$, the $0^{th}$-order diffraction beam $I_0$, and the $-1^{st}$-order diffraction beam $I_{-1}$, and wherein $\tau_+$, $\tau_0$, $\tau_-$ respectively denote times required for scanning the $1^{st}$-order diffraction beam $I_1$, the $0^{th}$-order diffraction beam $I_0$, and the $-1^{st}$-order diffraction beam $I_{-1}$ on the screen.

20. The laser projection system of claim 17, wherein two of the first, second, and third mirror surfaces are parallel with each other, and wherein the two mirror surfaces that are parallel with each other are offset relative to one of the first, second, and third mirror surfaces by the angle $\alpha'$.

21. The laser projection system of claim 20, wherein the laser projection system satisfies the equation below:

$$|I_1|\tau_1 = (|I_2| + |I_3|)\tau_2$$

wherein $|I_2|$ and $|I_3|$ denote intensities of diffraction beams scanned on the screen using two parallel mirror surfaces, wherein $|I_1|$ denotes an intensity of a diffraction beam scanned on the screen using a mirror surface different from the two parallel mirror surfaces, wherein $\tau_2$ denotes a time required for scanning the two diffraction beams on the screen using the two parallel mirror surfaces, and wherein $\tau_1$ denotes a time required for scanning the diffraction beam on the screen using the mirror surface different from the two parallel mirror surfaces.

22. A composite scanning unit comprising:
a plurality of mirror surfaces disposed along a rotation axis,
wherein at least two of the plurality of mirror surfaces sequentially scan diffraction beams having different orders on a screen,
wherein the composite scanning unit is adopted in a line scan type laser projection system,
wherein the line scan type laser projection system comprises a line type optical modulator,
wherein the line type optical modulator generates a $-1^{st}$-order diffraction beam, a $0^{th}$-order diffraction beam, and a $1^{st}$-order diffraction beam, and wherein the composite scanning unit further comprises:
a first scanner comprising a first mirror surface for scanning the $1^{st}$-order diffraction beam;
a second scanner comprising a second mirror surface for scanning the $0^{th}$-order diffraction beam; and
a third scanner comprising a third mirror surface for scanning the $-1^{st}$-order diffraction beam.

23. A laser projection system comprising:
a laser light source;
a line type optical modulator, which modulates a laser beam emitted from the laser light source using image information, to form a line panel;
a projection lens unit, which projects the line panel towards a screen; and
a composite scanning unit disposed between the projection lens unit and the screen, which scans the line panel on the screen,
wherein the composite scanning unit comprises a plurality of mirror surfaces disposed along a rotation axis,
wherein at least two of the plurality of mirror surfaces sequentially scan diffraction beams of different orders on the screen,
wherein the line type optical modulator generates a $-1^{st}$-order diffraction beam, a $0^{th}$-order diffraction beam, and a $1^{st}$-order diffraction beam, and
wherein the laser projection system further comprises:
a first scanner comprising a first mirror surface for scanning the $1^{st}$-order diffraction beam;
a second scanner comprising a second mirror surface for scanning the $0^{th}$-order diffraction beam; and
a third scanner comprising a third mirror surface for scanning the $-1^{st}$-order diffraction beam.

* * * * *